US 6,655,902 B2

(12) United States Patent
Dubé et al.

(10) Patent No.: US 6,655,902 B2
(45) Date of Patent: Dec. 2, 2003

(54) APPARATUS FOR STACKING ELONGATED MEMBERS

(75) Inventors: Richard Dubé, Saint-Nicolas (CA); Dany Blanchet, Sainte-Foy (CA)

(73) Assignee: Leggett & Platt LTD / Leggett & Platt LTEE, Waterloo (CA)

( * ) Notice: Subject to any disclaimer, the term of this patent is extended or adjusted under 35 U.S.C. 154(b) by 100 days.

(21) Appl. No.: 10/098,334

(22) Filed: Mar. 18, 2002

(65) Prior Publication Data

US 2003/0031550 A1 Feb. 13, 2003

(30) Foreign Application Priority Data

Aug. 10, 2001  (CA) .............................................. 2354979

(51) Int. Cl.[7] .............................................. B65G 57/02
(52) U.S. Cl. ..................... 414/789.5; 221/93; 221/296; 221/298; 414/792.7; 414/798.1; 198/774.3
(58) Field of Search .......................... 414/789.5, 793.4, 414/794.3, 798, 798.1, 792.7; 198/468.6, 614, 774.3; 221/93, 296, 298, 299, 301

(56) References Cited

U.S. PATENT DOCUMENTS 3,873,000 A  *  3/1975  Eaton et al. ......... 414/798.1 X
3,968,886 A  *  7/1976  Leon ....................... 414/789.5

* cited by examiner

Primary Examiner—Donald W. Underwood
(74) Attorney, Agent, or Firm—Ogilvy Renault; Guy J. Houle

(57) ABSTRACT

An apparatus for transferring rows of side-by-side elongated members from a conveyor to a stacking platform to form bundles. A plurality of parallel stacker arms are displaceable in a direction parallel to the conveying of the elongated members, between a retracted position, and a stacking position, wherein the stacker arms are positioned above the stacking platform for disposing rows of elongated members thereon. A ramp is displaceable between an inclined position and a horizontal position, for guiding the pivoting of the stacker arms about carriages, such that stacker arms moving from the retracted portion to the stacking position are pivoted upward to pick up a row of elongated members from the conveyor portion, and that stackers arms moving from the stacking position to the retracted position are kept generally horizontal, so as to encompass the rows of elongated members conveyed on the conveyor portion. A slat positioner is also disclosed.

27 Claims, 11 Drawing Sheets

FIG_6

FIG_7

FIG_9

FIG_10

APPARATUS FOR STACKING ELONGATED MEMBERS

FIELD OF THE INVENTION

The present invention generally relates to wood processing equipment and, more particularly, to an apparatus for stacking rows of elongated members to form bundles.

BACKGROUND OF THE INVENTION

In typical sawmills, wherein raw wood is sawn mechanically into lumber pieces (i.e., planks, boards, etc.), much effort is spent in maximizing the productivity and output. Consequently, sawmills are increasingly automated in order to accelerate speed of execution of the various tasks in the manufacturing of lumber pieces.

In one such task, rows of lumber pieces abutted side by side are transferred from a conveyor to form bundles. In some cases, slats are disposed between stacked rows in order to allow air to circulate between rows for the drying of the lumber pieces. Rows of lumber pieces may also be stacked to form bundles for the packaging and shipping thereof, in which case slats separating the rows are not always required.

U.S. Pat. No. 4,290,723, issued on Sep. 22, 1981 to Johansson, discloses a timber package arranger which comprises two sets of arms in complementary operation. These sets of arms translate one after another in a cyclic motion, and are each mounted to inclinable ramps which control the inclination of the sets of arms. Accordingly, a first set of arms moving forward on an inclined path accumulates lumber pieces being discharged from a conveyor. Once the first set of arms has gathered a predetermined amount of lumber pieces to form a row of side-by-side abutted lumber pieces, it is lowered to a planar position while still moving forward toward and over a bundle of stacked lumber pieces. The first set of arms then translates rearwardly, whereby a stop member discharges the lumber pieces accumulated on the first set of arms, onto a bundle being formed. The second set of arms executes the same motions to transfer rows of lumber pieces from a conveyor to the bundle, but lags the first set of arms. While the first set of arms discharges its load on the bundle, the second set of arms accumulates lumber pieces from the conveyor, and vice versa. The two sets of arms operate in synchronism. Accordingly, the conveyor is constantly discharged from its lumber pieces.

U.S. Pat. No. 5,613,827, issued on Mar. 25, 1997 to Vande Linde, discloses a dual-arm lumber stacker assembly. The assembly comprises sets of parallel stacker arms for engaging and lifting rows of lumber pieces ranging between 8 to 20 feet onto a stack consisting of other rows of lumber pieces, in order to form a bundle. These sets of stacker arms are oriented parallel to the direction of movement of a conveyor, which conveys lumber pieces to the stacking apparatus. A set of stacker arms comprises at least two arms which are spaced so that each piece of lumber spans at least these two arms to be supported thereby. The stacker arms each have a rearward end carried by a drive chain extending between a pair of spaced sprockets. The forward end of the stacker arms is positioned to engage and lift rows of lumber pieces carried on the conveyor. These stacker arms are each pivotally supported generally at the middle thereof on a slide bearing which moves back and forth with the movement of the arms, which are driven by the drive chain. When the rearward ends are carried around the sprockets by the drive chain, the stacker arms are caused to pivot on the slide bearing, thereby causing the forward ends of the stacker arms to be elevated and lowered as the arms reach opposed positions on the drive chain.

Dual sets of arms in complementary motion are a "must" in stacking apparatuses. However, further components of the stacking apparatuses may further be modified to adapt the stacking apparatuses for faster operating speeds and, consequently, maximized output and productivity.

SUMMARY OF THE INVENTION

It is a feature of the present invention to provide an apparatus for stacking rows of elongated members at a maximized speed.

It is a further feature of the present invention to provide a device for automatically disposing slats on selected rows of lumber pieces in conjunction with the above-mentioned apparatus.

According to the above feature of the present invention, and from a broad aspect thereof, the present invention provides an apparatus for transferring rows of side-by-side elongated members from a conveyor to a stacking platform to form bundles. The apparatus comprises a conveyor for conveying separate rows of the elongated members in a direction perpendicular to longitudinal axes of the elongated members. A plurality of parallel stacker arms are displaceable in a direction parallel to the conveying of the elongated members, between a retracted position, wherein the parallel stacker arms are positioned below the conveyor portion so as not to interfere with the elongated members being conveyed on the conveyor portion, and a stacking position, wherein the stacker arms are positioned above the stacking platform for disposing rows of elongated members thereon. Each stacker arm has a rear end connected to a carriage so as to pivot about the carriage. Each carriage is actuated so as to displace each stacker arm between the retracted position and the stacking position. Each stacker arm has a follower portion in operative contact with a ramp. The ramp is displaceable between an inclined position and a horizontal position, for guiding the pivoting of the stacker arms about the carriages, such that stacker arms moving from the retracted position to the stacking position are pivoted upward to pick up a row of elongated members from the conveyor portion, and that stackers arms moving from the stacking position to the retracted position are kept generally horizontal, so as to encompass the rows of elongated members conveyed on the conveyor portion. The plurality of stacker arms are divided in a first group of stackers arms and a second group of stacker arms. The first group of arms moves in concert from the retracted position to the stacking position so as to pick-up a row of elongated members being conveyed on the conveyor portion, while the second group of arms moves oppositely in concert from the stacking portion to the retracted portion, and vice-versa.

According to a further broad aspect of the present invention there is provided an apparatus for disposing slats between rows of a product being deposited on a bundle being formed. The apparatus comprises an outer shell portion defining a magazine for storing a stack of slats. The magazine is open at a bottom end thereof for slats to outlet therefrom. Pincer arms are pivotally mounted to the outer shell portion so as to be displaceable between a pincer arm supporting position and a pincer arm bypassing position. The pincer arm each have a finger projecting laterally from a bottom end thereof so as to block the open bottom end of the magazine when the pincer arms are in the pincer arm supporting position. A carriage is operatively mounted to the outer shell portion so as to translate vertically thereon. The carriage is adapted for being actuated in displacement between a carriage retracted position and a carriage discharging position. The carriage has transport arms pivotally mounted thereto. The transport arms each have a support surface portion projecting laterally from a bottom thereof. The support surface portions are positioned generally below the open bottom end of the magazine. Displacement of the carriage from the carriage discharging position to the carriage retracted position actuates the pincer arms into pivoting from the pincer arm supporting position to the pincer arm bypassing position, and back to the pincer arm supporting position, so as to dispense a bottommost slat from the stack of slats in the magazine onto the support surface portion of the transport arms. Displacement of the carriage from the carriage retracted position to the carriage discharging position causes the slat on the support surface portions to be disposed on the bundle being formed.

BRIEF DESCRIPTION OF THE DRAWINGS

A preferred embodiment of the present invention, with examples thereof, will now be described in detail having reference to the accompanying drawings in which.

DESCRIPTION OF THE PREFERRED EMBODIMENTS

Figure 1:
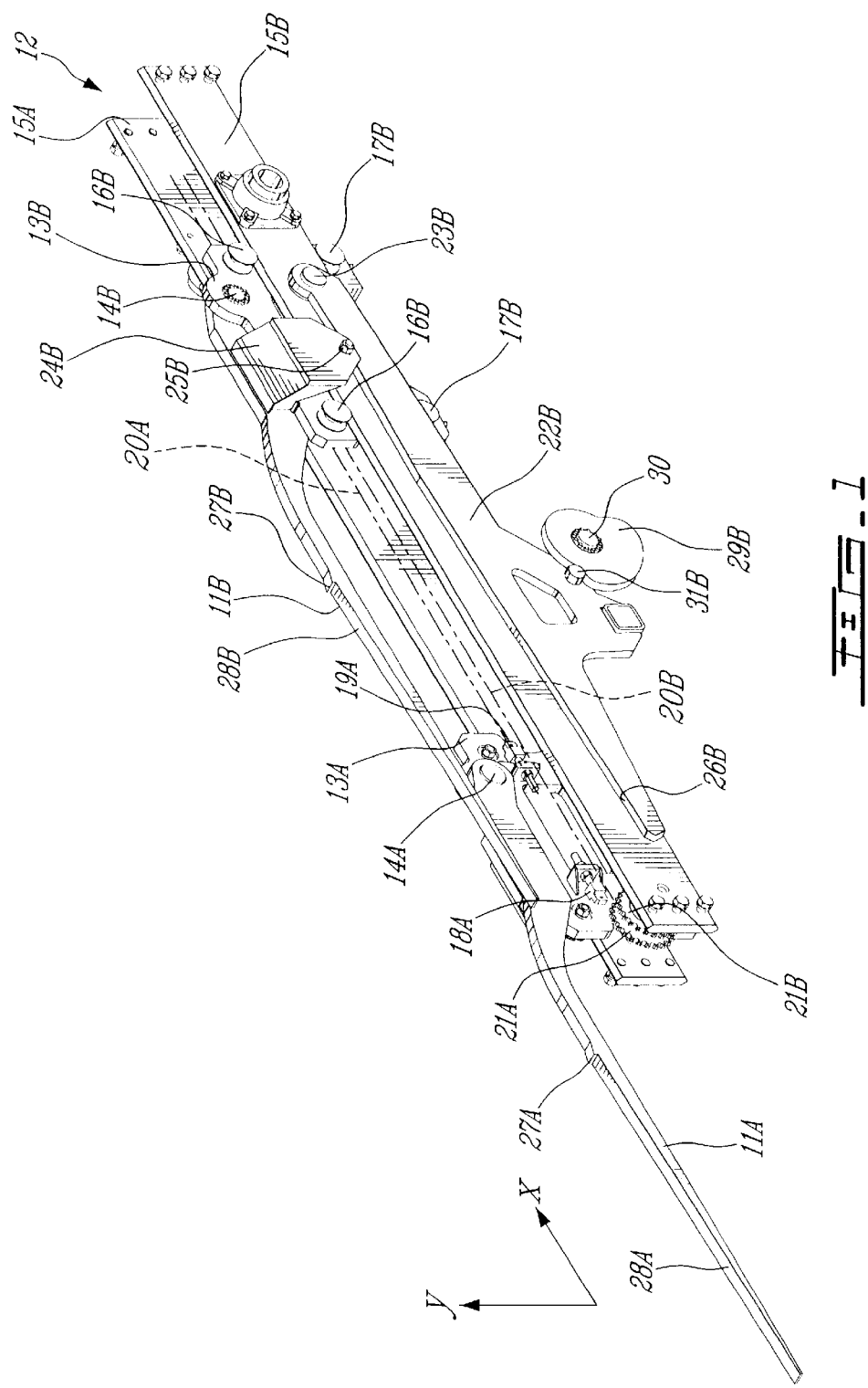
FIG. 1 is a perspective view of a stacking arm driving mechanism constructed in accordance with the present invention.
Figure 3:
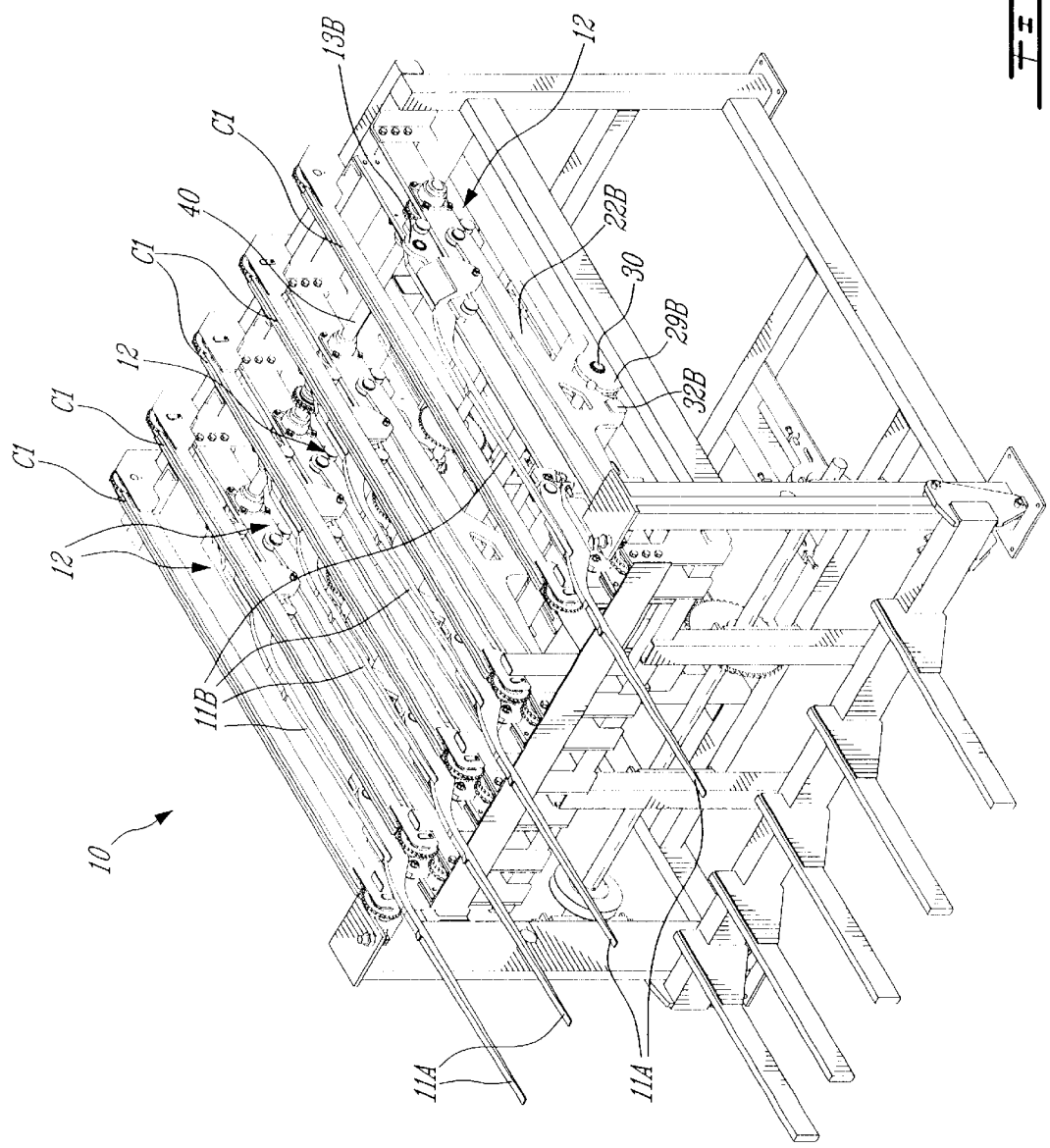
FIG. 3 is a perspective view, with parts removed, of an apparatus for stacking elongated members constructed in accordance with the present invention.

Referring to the drawings and more particularly to FIG. 3, an apparatus for stacking elongated members, such as lumber pieces (e.g., ranging at least between 4 to 20 feet of length), is generally shown at 10, and will be referred to hereinafter as "apparatus 10" for simplicity purposes. The apparatus 10 comprises a group of stacker arms 11A and a group of stacker arms 11B. The apparatus 10 has a plurality of driving mechanisms 12, which each comprise a pair of stacker arms, namely arm 11A and arm 11B. Referring to FIG. 1, only one driving mechanism 12 is shown in detail, and will be used for the description for clarity.

Both stacker arms 11A and 11B are displaceable in the driving mechanism 12 between a stacking position and a retracted position. As illustrated in FIG. 1, stacker arm 11A is in the stacking position, whereas stacker arm 11B is in the retracted position. The driving mechanism 12 has two symmetrically similar stacker arm mechanisms. For simplicity purposes, both stacker arm mechanisms will be described without having reference to the affixed letter, i.e., A or B, keeping in mind that the stacker arm mechanisms are symmetrically similar. For instance, stacker arms will be referred to hereinafter as "stacker arms 11," unless otherwise stated. However, the figures will have the letters A and B affixed to the reference numerals. The description will thus not be duplicated for stacker arms 11A and 11B.

Figure 2:
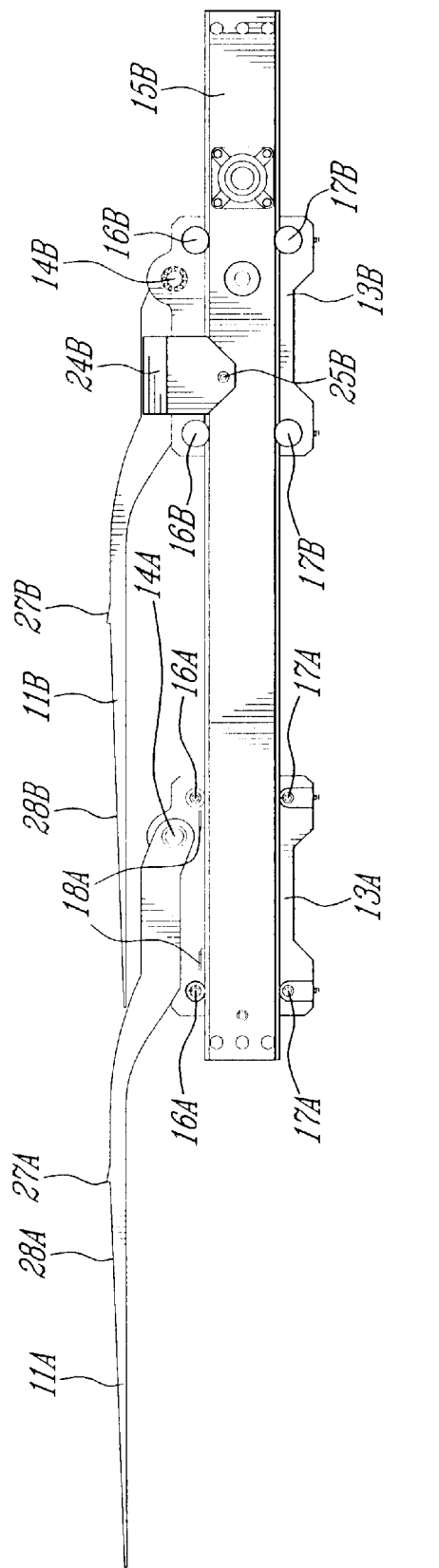
FIG. 2 is a side elevational view of FIG. 1.

In FIGS. 1 and 2, the stacker arm 11 is shown mounted at an end thereof to a carriage 13. The stacker arm 11 is pivotally mounted to a pivot 14 of the carriage 13 through a bearing device (not shown), whereby the stacker arm 11 may rotate about the pivot 14. The carriage 13 is operationally mounted to a track 15. The track 15 consists of an elongated rectangular plate disposed vertically. The carriage 13 is shown having a pair of upper wheels 16 and a pair of lower wheels 17, whereby it may translate back and forth in the X axis direction on the track 15. The carriage 13 further comprises a front connector 18 and a rear connector 19, whereby it is secured to opposed ends of a chain 20. The chain 20 extends between sprockets 21, which are idle on track 15. Therefore, rotation of the sprockets 21 will actuate the chain 20, which will displace the carriage 13 accordingly in the X axis direction.

A ramp 22 is shown lying against a lateral face of the track 15. The ramp 22 is mounted to a pivot 23 near an end of the track 15, so as to pivot thereabout. The stacker arm 11 has an abutment 27 on a top edge 28 thereof and a leg 24 projecting therefrom adjacent to its pivot 14. The leg 24 extends over the track 15 and has at a bottom thereof a roller 25, sitting on a top edge 26 of the ramp 22. Therefore, when the stacker arm 11/carriage 13 assembly moves back and forth on the track 15, the position of the stacker arm 11 with respect to the pivot 14 will be controlled by the inclination of the ramp 22. In other words, the ramp 22 is pivoted about pivot 23, so as to guide the position of the stacker arm 11, which rolls on the top edge 26 of the ramp 22. The ramp 22 is displaceable between an inclined position and a horizontal position. The pivoting of the ramp 22 is controlled by a cam 29 disposed on a cam shaft 30. The ramp 22 has a follower 31 projecting laterally therefrom, and in operating contact with the periphery of the cam 29. Therefore, rotation of the cam 29 about the axis of the camshaft 30 will result in the ramp 22 pivoting upward or downward according to the position of the follower 31 on the periphery of the cam 29.

It is pointed out that there is only one camshaft 30 for both cams 29A and 29B. However, the cams 29 are disposed in opposed positions on the camshaft 30, such that one of the ramps 22 is at its uppermost position while the other of the ramps 22 is at its bottommost position. The object is to have the stacker arm 11 going to the stacking position, i.e., stacker arm 11A in FIG. 1, being lifted by the ramp 22 to pick up rows of lumber pieces from a conveyor, whereas the other stacker arm, i.e., stacker arm 11B in FIG. 1, which simultaneously goes toward the retracted position, to be at its lowermost point to avoid the conveyor. Therefore, the cams 29 are synchronized with the movement of the carriages 13 so as to lift the stacker arm 11 which is moved from the retracted position to the stacking position (i.e., in the negative X axis direction), while opposingly lowering the stacker arm 11 moving from the stacking position to the retracted position (i.e., in the positive X axis direction). Furthermore, the carriages 13A and 13B are synchronized to move simultaneously in opposed directions, as driven by chains 20. It is pointed out that one of the carriages 13 must be mounted to a top portion of the chain 20 (i.e., as shown, carriage 13A in FIG. 1), whereas the other carriage 13 must be mounted to a bottom portion of the chain 20. Therefore, when the carriage 13A has the stacker arm 11A in the stacking position, the carriage 13B will have the stacker arm 11B in the retracted position. The carriages 13A and 13B will be actuated at the same time in order for the stacker arms 11A and 11B to exchange positions. As mentioned previously, the cams 29A and 29B are synchronized with this motion to adjust the vertical motion of the stacker arms.

Referring now to FIG. 3, a plurality of driving mechanisms 12 are shown side by side. Each driving mechanism 12 has a stacker arm 11A and a stacker arm 11B. As shown in FIG. 3, all stacker arms 11A are simultaneously in the stacking position, whereas all stacker arms 11B are at the same time in the retracted position. The chains 20 of each driving mechanism 12 are synchronized in order to move in concert all stacker arms 11A from a position to another, and all stacker arms 11B in the direction opposite to the direction of stacker arms 11A. Although this may be achieved through various transmissions, the present invention preferably has chains 20 each driven by a rear one of the sprockets 21, which are all mounted to a single drive shaft 40. Consequently, by simply rotating the drive shaft 40, all chains 20 and, therefore, all stacker arms 11 will move simultaneously as described above. Furthermore, the ramps 22A, which guide the upward and downward motion of the stacker arms 11A, are all interconnected by a connection bar 32A. Therefore, one cam 29A may be provided for controlling the pivoting of all ramps 22A. However, a second cam 29A is preferably provided at an end of the camshaft 30 in order to support the connection bar 32A on its full span. Similarly, only one cam 29B may be provided for the totality of the ramps 22B. The camshaft 30 is preferably driven by a same motor as the drive shaft 40 to facilitate the synchronous motions therebetween. This is readily achievable by sprocket and pulleys.

Figure 4:
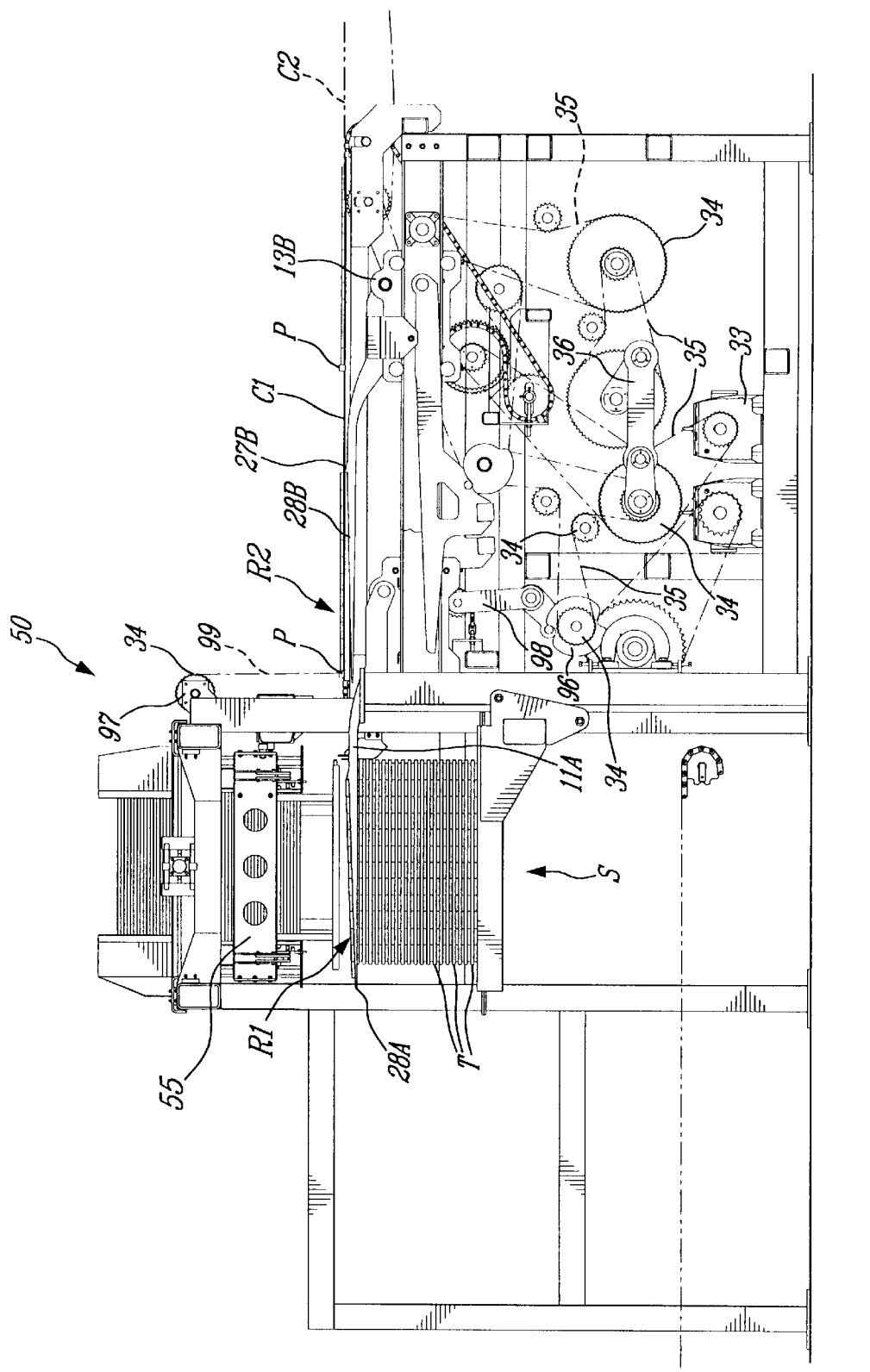
FIG. 4 is a side elevational view of the apparatus for stacking elongated members with slat positioners in accordance with the present invention.

Now that the stacking mechanism of the apparatus 10 has been described in detail, its steps of operation will be described, having reference to FIG. 4. The apparatus 10 is provided with a single motor 33 in order to actuate the back-and-forth motion in the X axis direction of the groups of stacker arms 11A and 11B, the pivoting of the ramps 22A and 22B by rotating the cams 29A and 29B on the camshaft 30, and the conveyors C1 and C2 upon which rows of lumber pieces are conveyed. By having only motor 33 actuating all four above-described elements, the synchrony of the stacker arms 11A and 11B with respect to the rows of lumber pieces to be picked up from the conveyor C2 is readily achieved by using a sprocket-and-chain transmission to divide the actuation from the motor 33.

Therefore, a plurality of sprockets 34 and chains 35 are provided but will not be described in detail and are configured in order to actuate the apparatus according to the steps of operation which will now be described. The stacker arms 11B (only one shown) are shown in the retracted position in FIG. 4. The stacker arms 11B are on the verge of moving toward the stacking position by being pushed forward by carriages 13B. As they move forward, the ramps 22B will be pivoted upward to the inclined position by the cams 29B in order for the stacker arms 11B to move upward as they move toward the stacking position (i.e., in the negative X axis direction). A row of lumber pieces R2 is conveyed at the same time on the conveyor C2, abutted against a lug P. The upward motion of the stacker arms 11B will coincide with the row of lumber pieces R2 moving over the top edges 28 thereof. Therefore, the row of lumber pieces R2 will be picked up by the top edges 28 of the stacker arms 11B. The abutments 27B of the stacker arms 11B ensures the proper positioning of the row of lumber pieces R2 thereon.

At the same time, the stacker arms 11A (only one shown), which had previously picked up a row of lumber pieces R1, is in the stacked position, whereby it is over a stack of lumber pieces S. The stacker arms 11A will start moving from the stacking position to the retracted position at the same time as the stacker arms 11B move from the retracted position to the stacking position. A stopper (not shown) will help discharge the row of lumber pieces R2 from the stacker arms 11A to the stack of lumber pieces S. Therefore, as the stacker arms 11A move toward the retracted position (i.e., in the positive X axis direction), the lumber pieces on the top edge 28A of the stacker arms 11A will slowly be discharged to the stack S of lumber pieces. It is pointed out that the ramp 22A is in the horizontal position when the stacker arm 11A returns to the retracted position. Consequently, the stacker arm 11A encompasses the lumber pieces on the conveyor. It is further pointed out that the stack S being formed is on a moveable platform (not shown) which is progressively lowered so as to always have the top of the stack S at the same height when receiving a row of lumber pieces.

The back-and-forth motion of the carriages 13A and 13B is achieved by a crank 36 modifying the circular output of the motor 33. As the various motions of the apparatus 10 are all controlled by a motor 33, the speed of the motor 33 may be varied, in which case all motions of the apparatus 10 will still coincide. This will enable each group of stacker arms to execute between 10 and 15 stacking cycles per minute. With each stacking cycle involving a row of more than a dozen lumber pieces (e.g., 16 lumber pieces by row), over 300 lumber pieces may be stacked per minute. Furthermore, the stacking arms 11A and 11B are very stable as they are only pivoted at an end thereof and secured to the carriages 13A and 13B, which are supported by the tracks 15A and 15B at four points (i.e., upper wheels 16 and lower wheels 17). Also, as the top edges 28 of the ramps 22 are smooth, the motion of the stacker arms 11A and 11B will also be smooth, thereby enabling faster speeds of translation and operation of the apparatus 10.

As the apparatus 10 for stacking elongated members has been described in detail, a slat positioner 50 to be used in conjunction with the apparatus 10 will now be described. Referring to FIG. 4, the slat positioner is generally shown at 50 and is positioned above the stack S of lumber pieces to dispose spacer slats between rows thereof. A plurality of spacer slats T are sandwiched between rows of lumber pieces. As discussed previously, the slats T create a space between the rows of lumber pieces, whereby air may circulate therethrough to enhance the drying of the lumber pieces. The slats T also help stabilize the stack S being formed therewith.

Figure 5:
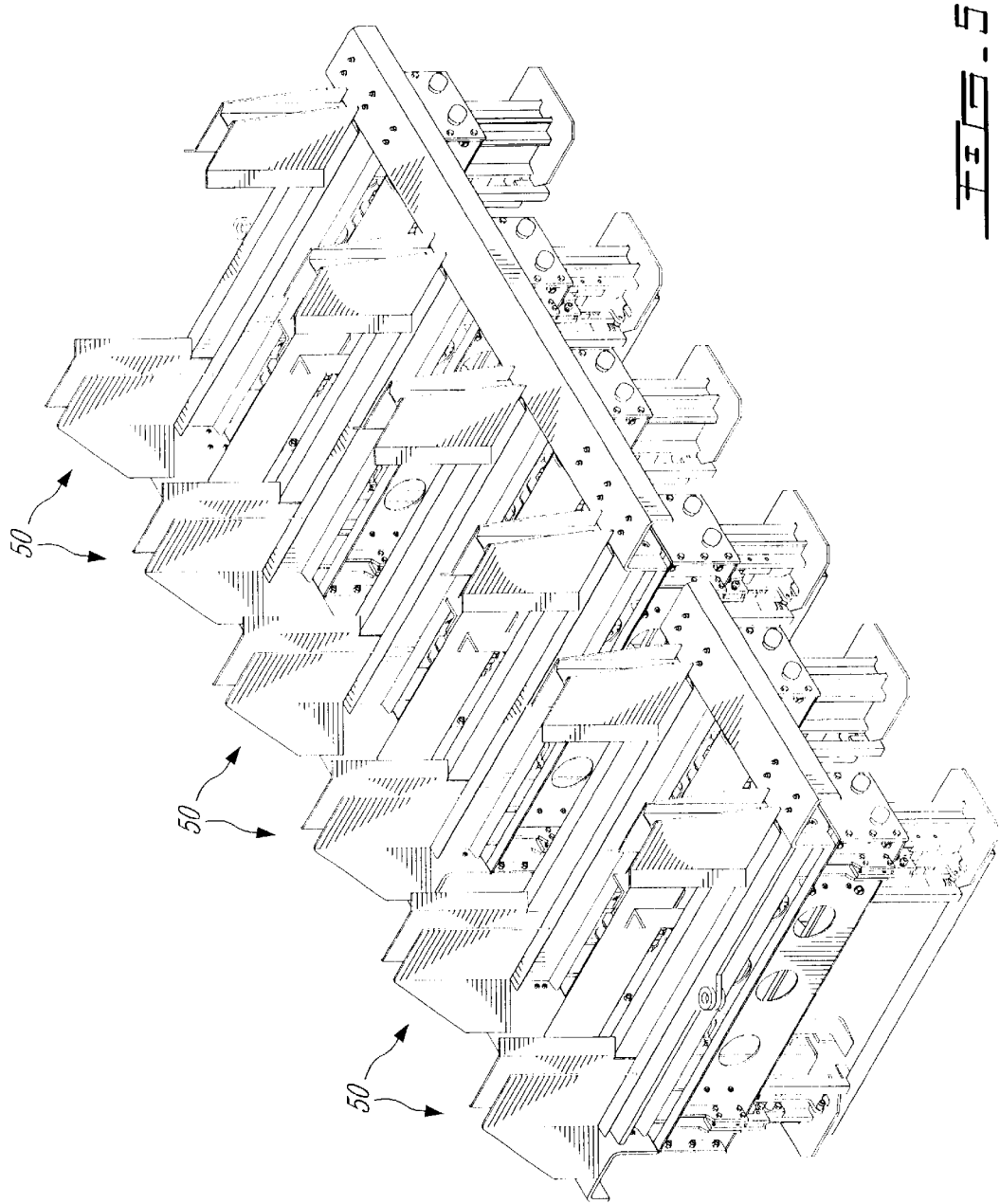
FIG. 5 is a perspective view of a bank of slat positioners.

Referring to FIG. 5, a plurality of slat positioners 50 are shown mounted side by side. The slats T are preferably disposed with their longitudinal axes perpendicular to the longitudinal axes of the lumber pieces. Therefore, at least one slat must be provided at each opposed end portion of the stack S for the latter to be stable. For instance, FIG. 5 illustrates a bank of two interconnected slat positioners 50 moving in concert and a bank of four interconnected slat positioners 50 moving in concert, for ensuring that rows of lumber pieces are well supported by slats. One of the banks may be moved with respect to the other to adapt the slat dispensing to the size of the bundle requiring slats.

Figure 6:
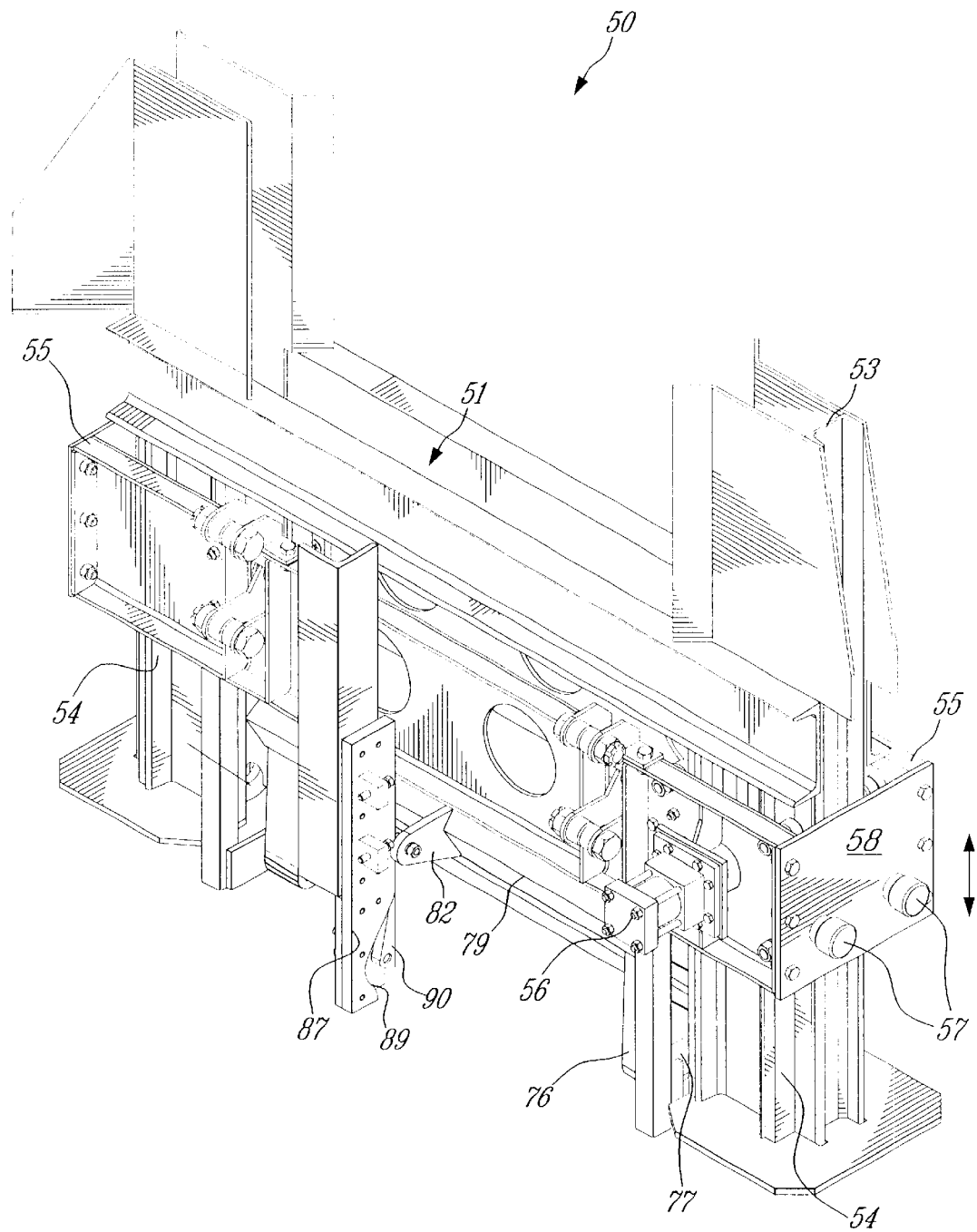
FIG. 6 is a perspective view of one of the slat positioners.
Figure 7:
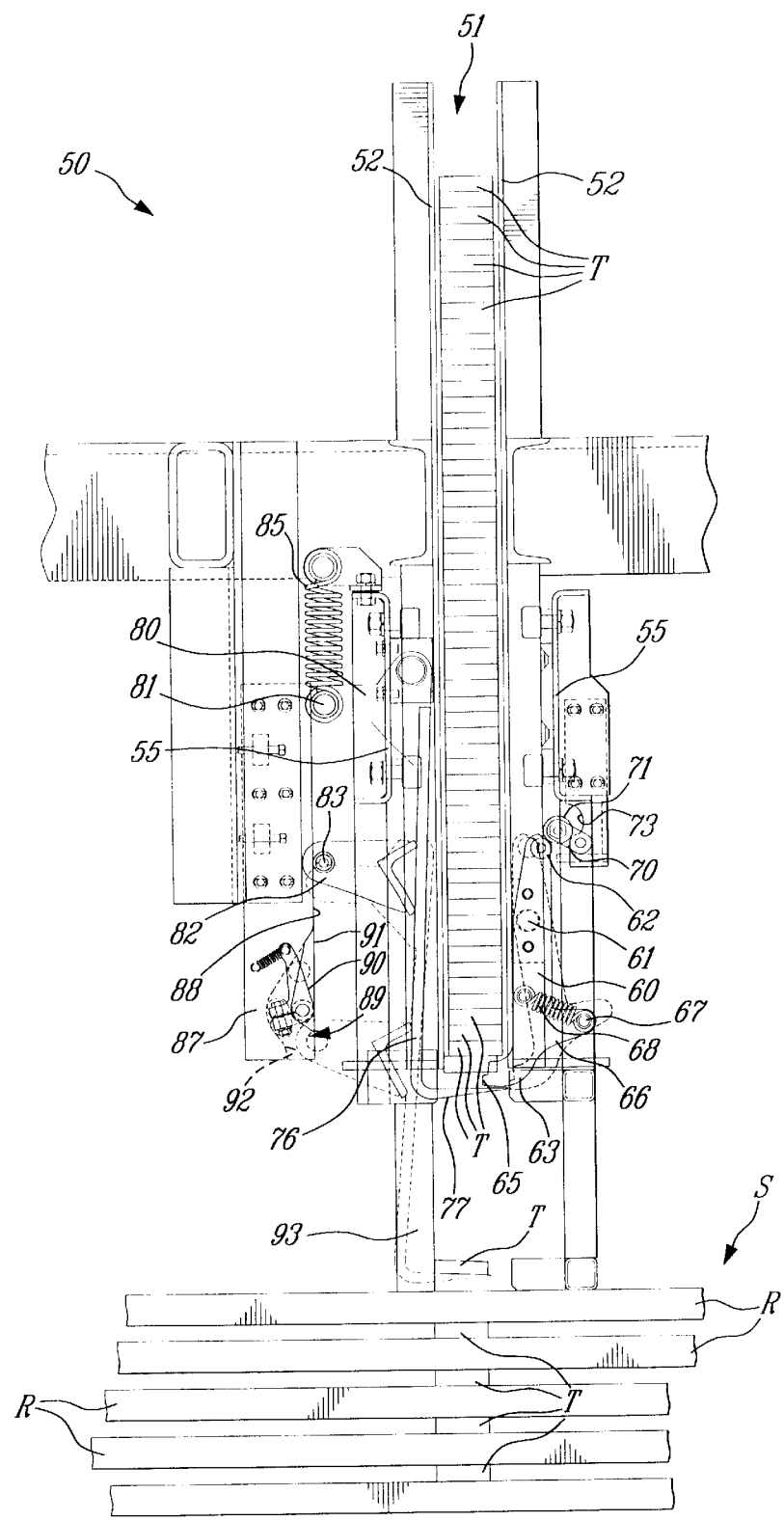
FIG. 7 is a cross-sectional view of one of the slat positioners.

The six slat positioners 50 of the bank illustrated in FIG. 5 are similar, and thus only one slat positioner 50, as shown in FIG. 6, will be used in the description for simplicity and clarity purposes. As best seen in FIG. 7, the slat positioner has a magazine 51 for storing a stack of slats T. The magazine 51 is defined by a pair of longitudinal parallel walls 52, against which the slats T longitudinally abut, and a pair of parallel lateral walls 53 (only one of which is shown), which are opposite the ends of the slats T in the magazine 51. The magazine 51 is open at a top end thereof in order to be loaded with slats T, whether it be automatically or manually. Furthermore, the magazine 51 is open at a bottom thereof, in order for slats T to outlet therefrom to be disposed on the bundle being formed.

The parallel longitudinal walls 52 and the parallel lateral walls define an outer shell of the slat positioner 50. The outer shell comprises four tracks, only two of which are visible as shown by 54 in FIG. 6. A carriage 55, defined by a hollow rectangular-shaped frame surrounding the outer shell, is operationally mounted to the tracks 54 so as to translate up and down thereon. The carriage 55 is displaceable between a retracted position, as shown in FIG. 6, and a discharging position. Both these positions will be explained hereinafter with the description of the steps of operation of the slat positioner 50. As seen in FIG. 6, a cylinder 56 is secured to the carriage 55 and is provided for locking the carriage 55 in the retracted position. Connector pins 57 project outwardly from a side 58 of the carriage 55, and are used to connect the carriage 55 to actuation means in order for the carriage 55 to be driven upwardly and downwardly as explained above. The connector pins 57 may also be replaced by rollers running horizontally on a support frame, while being driven vertically.

Figure 8:
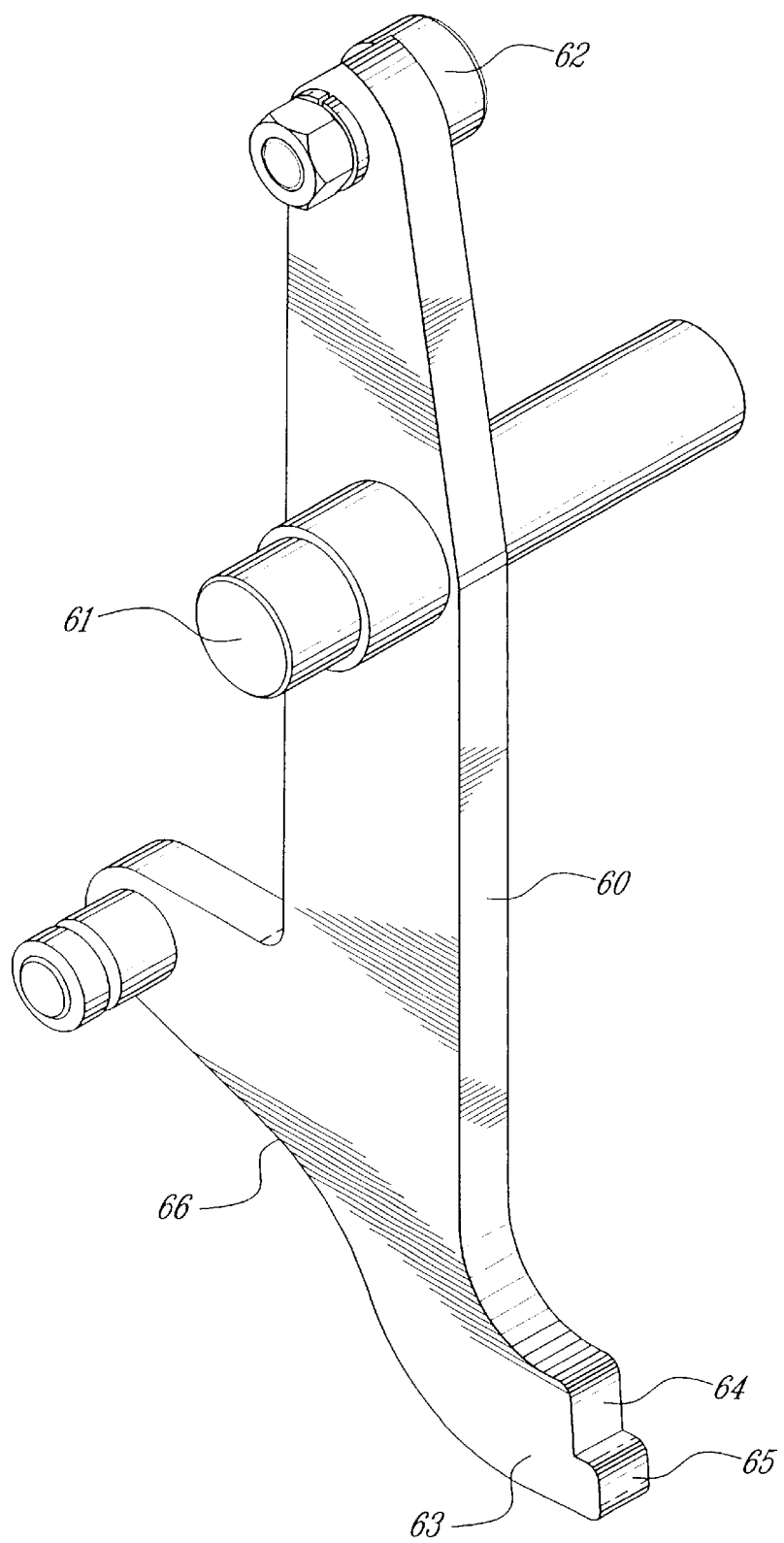
FIG. 8 is a perspective view of a pincer arm in accordance with the present invention.

As shown in FIGS. 7 and 8, the slat positioner 50 has a pair of pincer arms 60 (only one of which is visible as the two pincer arms 60 are similar, juxtaposed and spaced apart), rotatably mounted to pivots 61 which are secured to the outer shell thereof. The pincer arms 60 each define an upstanding slender shape with a follower 62 at a top end thereof. A first finger 63 project outwardly from a bottom end thereof and has a contact surface 64 from which projects a lip 65. A second finger 66 projects outwardly from the bottom end of the pincer arm 60, yet in an opposed direction to the first finger 63. A connection pin 67 extends laterally from the second finger 66.

As shown in FIG. 7, the pincer arms 60 are positioned on the slat positioner 50 so as to have the first fingers 63 positioned at the bottom open end of the magazine 51. The pincer arms 60 are displaceable in concert between a supporting position, as shown in FIG. 7, wherein the pincer arms 60 have the first fingers 63 obstructing the open end of the magazine 51, and a bypassing position, whereby the pincer arms 60 have the first fingers 63 pivoted away from the magazine 51 to allow for the slats to outlet from the bottom end thereof. Biasing devices, such as a compression spring 68, bias the pincer arms 60 toward the supporting position, by connecting the pins 67 to the outer shell of the slat positioner 50.

Figure 11:
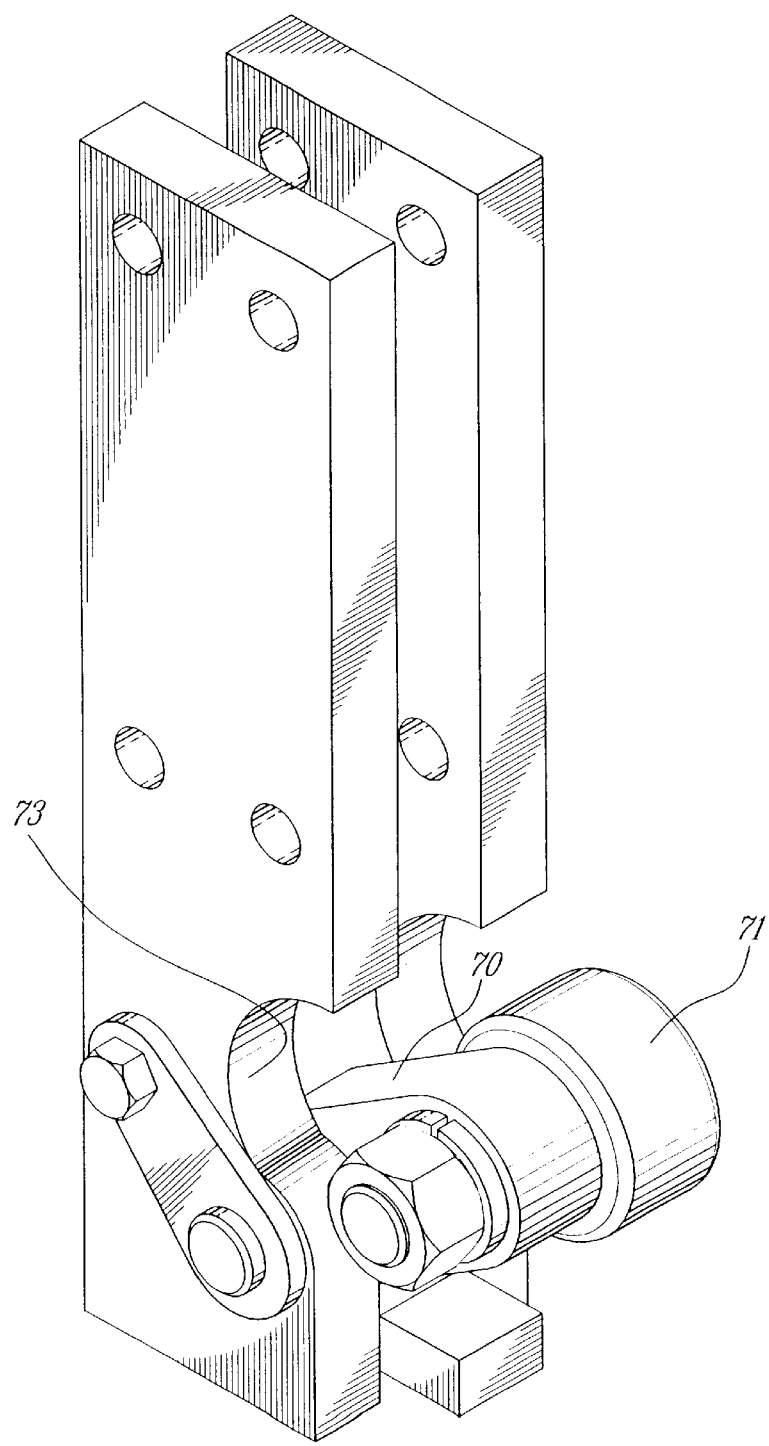
FIG. 11 is a perspective view of a pincer actuator arm in accordance with the present invention.

Referring to FIG. 7, the carriage 55 is shown having a pair of pincer actuator arms 70, only one of which is visible as the two pincer actuator arms 70 are similar and juxtaposed in spaced-apart relationship and move in concert. The pincer actuator arms 70 are each pivotally mounted at an end thereof to the carriage 55. The pincer actuator arms 70 each have a roller guide 71 at an opposed end thereof. The arm 70 is displaceable between an actuating position, as shown in FIG. 11, and a bypassing position. The arm 70 is rests by gravity in the actuating position. A groove 73 is defined above the pivot end of each pincer actuator arm 70 so as to accommodate the opposed end of the pincer actuator arms 70 when the latters are pivoted to the bypassing position. The roller guide 71 is in operational contact with the follower 62 of the pincer arm 60. When the carriage 55 translates downward from the retracted position to the discharging position, the contact between the roller guides 71 of the pincer actuator arms 70 and the followers 62 of the pincer arms 60 will result in the pincer actuator arms 70 pivoting from the actuating position to the bypassing position, i.e., within the grooves 73 of the carriage 55 to encompass the followers 62 of the pincer arms 60. When the carriage 55 translates upward from the discharging position to the retracted position, the pincer actuator arms 70, having returned to their actuating position, will force the pincer arms 60 to move to their bypassing position by exerting pressure on the followers 62. Therefore, the pincer actuator arms 70 will avoid the followers 62 of the pincer arms 60 when moving downward, by pivoting to this bypassing position, whereas an upward motion of the pincer actuator arms 70 will displace the pincer arms 60 to their bypassing position by the roller guides 71 displacing the followers 62.

Figure 9:
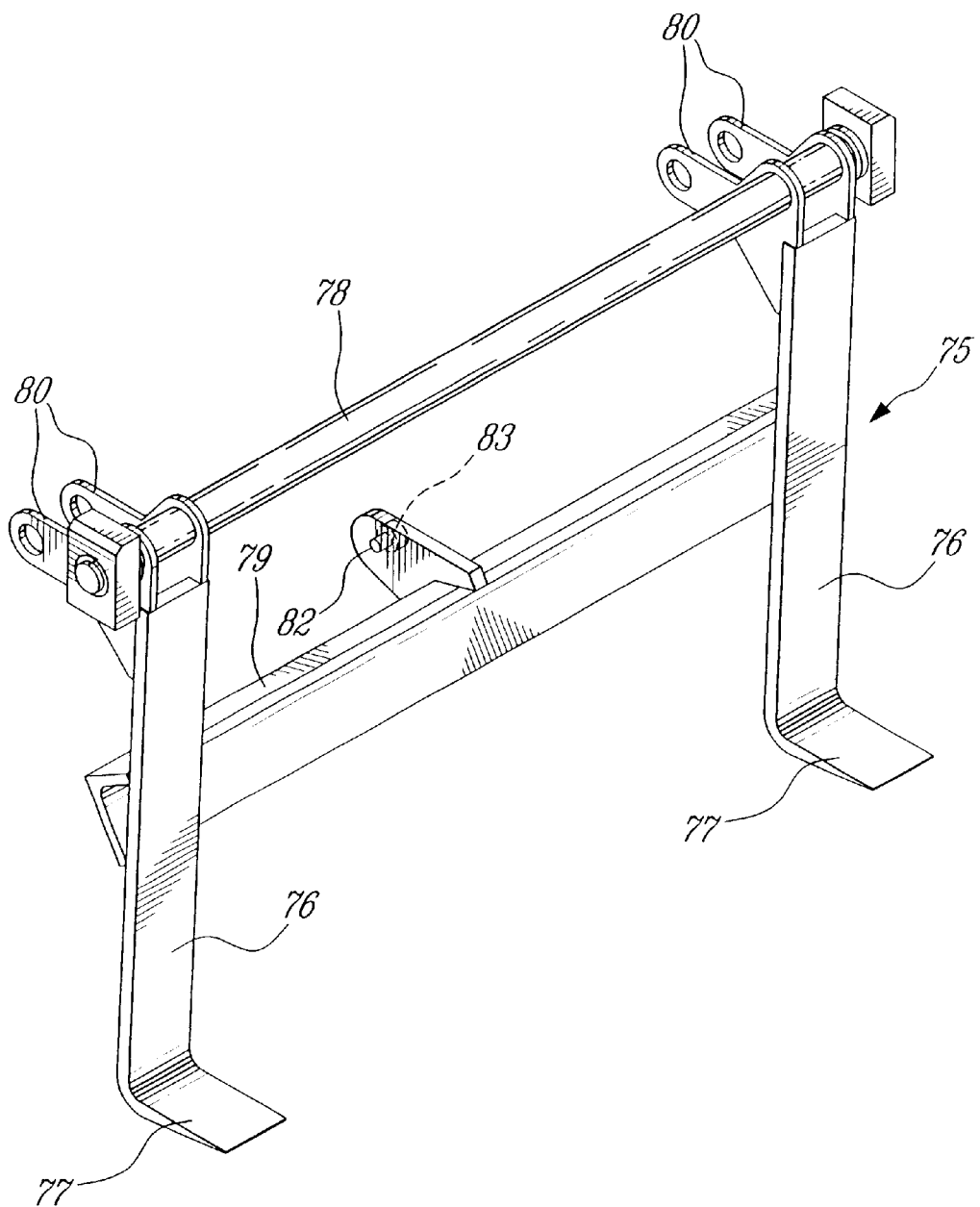
FIG. 9 is a perspective view of a transport arm mechanism in accordance with the present invention.

Referring now to both FIGS. 7 and 9, a transport arm mechanism is generally shown at 75. The transport arm mechanism 75 has a pair of transport arms 76 having support surfaces 77 projecting perpendicularly from a bottom end thereof. The transport arms 76 are rotatably mounted to a pivot rod 78 at top ends thereof. An angle 79 interconnects the transport arms 76 by being secured to middle portions thereof. Pairs of connection plates 80 are mounted to the top ends of the transport arms 76, and are each adapted to support a pin 81. The angle 79 has a follower 82 projecting laterally therefrom. As seen in FIG. 7, the follower 82 has a follower wheel 83.

The transport arm mechanism 75 is secured to the carriage 55 by the pivot rod 78 at a top end thereof. Accordingly, the transport arms 76 may pivot about the carriage 55, as they are rotatably mounted to the pivot rod, and may translate vertically with the carriage 55 on the outer shell of the slat positioner 50. As the transport arms 76 are connected to one another by the angle 79, both transport arms 76 will move in concert. The transport arm mechanism 75 is secured to the carriage 55 so as to have the support surfaces 77 directly below the bottom open end of the magazine 51, when the carriage 55 is in the retracted position, as best illustrated by FIG. 7. A biasing device, such as tension springs 85, connects the transport arm mechanism 75 via the pins 81 to the carriage 55. The tension springs 85 will bias the transport arms 76 such that the follower wheel 83 of the follower 82 abuts a template 87, as shown in FIG. 7.

Figure 10:
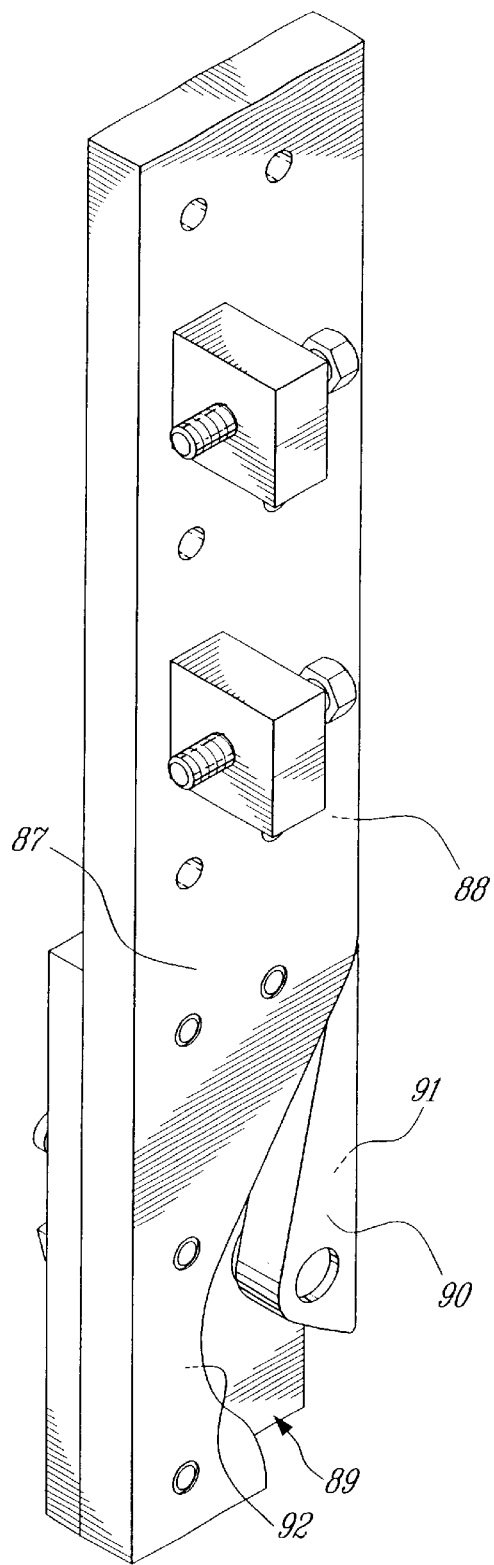
FIG. 10 is a perspective view of a template in accordance with the present invention.

The template 87 is best shown in FIGS. 7, 10 and 11, and as a generally rectangular shape defining a guide edge 88. The template 87 is secured to the outer shell, and thus does not move with the carriage 55. The follower wheel 83 of the transport arm mechanism 75 is biased against the guide edge 88. The template 87 has a groove 89 at a bottom thereof. A finger 90 is pivotally mounted to the template 87, and is biased against a portion of the groove 89. The finger 90 has a flat edge 91, which is in a side-by-side planar relationship with the guide edge 88.

As the carriage 55 is translated downward towards its discharging position, the follower wheel 83 of the transport arm mechanism 75 will roll against the guide edge 88 and the flat edge 91 of the template 87, as it is biased thereagainst by the tension spring 85. As the carriage 55 reaches the discharging position, the follower wheel 83 will reach the bottom of the flat edge 91 of the finger 90, whereby it will move in the groove 89 of the template 87 due to the biasing to which it is subjected. As the carriage 55 moves from the discharging position upward to the retracting position, the follower wheel 83, and thus the transport arms 76, will be guided by the guide edge 92 of the groove 89 and follow the shape of the guide edge 92. As the follower wheel 83 further moves upward in the groove 89, the finger 90 will pivot to allow the follower wheel 83 to re-engage to contact with the guide edge 88.

As the slat positioner 50 has been described in detail, the steps of its operation will now be described, with reference mostly to FIG. 7. Initially, a slat T is supported on the support surfaces 77 of the transport arms 76. Also, the pincer arms 60 are in their supporting position, with the contact surface 64 of pincer arms 60 squeezing the penultimate slat against one of the longitudinal walls 52, so as to support the stack of slats T in the magazine 51 and prevent them from falling downward through the bottom open end. The carriage 55 is in the retracted position, whereby the transport arms 76 are positioned just below the bottom open end of the magazine 51. As the carriage 55 is displaced to the discharging position, the transport arms 76 will move downwardly as guided by the follower wheel 83 rolling on the guide edge 88 and the flat edge 91 of the template 87. When the carriage 55 reaches its discharging position, the transport arms 76 will abruptly be forced in the groove 89 of the template 87 by the tension springs 85. A stopper leg 93 will discharge the slat T from the support surfaces 77, whereby the slat T will be disposed on the bundle S.

During the displacement of the carriage 55 from the retracted position to the discharging position, each of the pincer actuator arms 70 will encompass the follower 62 of the pincer arm 60 by pivoting to the groove 73 to reach its bypassing position. Once the pincer arms 60 are below the pincer actuator arms 70, the latter will move back to the actuating position. It is pointed out that the pincer arms 60 remain in their supporting position during the downward motion of the carriage 55.

During the displacement of the carriage 55 from the discharging position to the retracted position, the follower wheel 83 of the transport arm mechanism 75 will follow the groove 89 to re-engage to contact with the guide edge 88 by the pivoting of the finger 90, as explained above. When the carriage 55 is on the verge of reaching the retracted position, the pincer actuator arms 70, in the actuating position, will pivot the pincer arms 60 to the bypassing position such that the stack of slats T moves downward by gravity. The stack of slats T will fall onto the support surfaces 77 of the transport arm mechanism 75. The pincer arm 60, returning to the supporting position, will have the lip 65 push the bottommost slat T of the stack, which will get detached from the stack to remain on the support surfaces 77. The pincer arm 60 will also have the contact surface 64 squeezing the penultimate slat against one of the longitudinal walls 52. The bottommost slat, having just reached the support surfaces 77, will be disposed on the next row of the bundle S. It is pointed out that the action of the lip 65 to separate the bottommost slat from the stack is often useful as the environment of the slat positioner 50 may involve high humidity (from the lumber pieces) and low temperatures. Therefore, adjacent slats may be stuck together.

The slat positioner 50 is adapted for operating at high speed, jointly with the apparatus 10. As shown in FIG. 4, the motor 33, which drives the various components of the apparatus 10, is also used for the actuation of the slat positioner 50. The motor 33 will drive a cam 96 through sprockets 34 and chains 35. The cam 96 will move a sprocket 97 in a back-and-forth motion, by an arm and follower assembly, generally shown at 98. A chain 99 extends between the moving sprocket 97 and the connector pins 57 through other sprockets 34, such that the back-and-forth motion of the sprocket 97 will result in the carriage 55 being displaced between its retracted position and its discharging position.

Therefore, the output rate of the slat positioner 50 will be synchronized with the operation of the apparatus 10. Acceleration of the motor 33 will result in both the apparatus 10 and the slat positioner 50 adjusting their operating speeds to remain synchronized. It is pointed out that the slat positioner 50 may have various other configurations. For instance, the slat positioner 50 described above has a pair of pincer arms 60 and a pair of transport arms 76 for supporting slats on opposed end portions. However, the pincer arm 60 and the transport arm 76 could each be widened in order to have a great enough surface for each supporting slats by itself.

It is within the ambit of the present invention to cover any obvious modifications of the preferred embodiment described herein, provided such modifications fall within the scope of the appended claims.

What is claimed is:

1. An apparatus for transferring rows of side-by-side elongated members from a conveyor to a stacking platform to form bundles, said apparatus comprising:

a conveyor portion for conveying separate rows of said elongated members in a direction perpendicular to longitudinal axes of said elongated members;

a plurality of parallel stacker arms displaceable in a direction parallel to the conveying of said elongated members, between a retracted position, wherein said parallel stacker arms are positioned below said conveyor portion so as not to interfere with said elongated members being conveyed on said conveyor portion, and a stacking position, wherein said stacker arms are positioned above said stacking platform for disposing rows of elongated members thereon;

each said stacker arm having a rear end connected to a carriage so as to pivot about said carriage, each said carriage being actuated so as to displace each said stacker arm between said retracted position and said stacking position;

each said stacker arm having a follower portion in operative contact with a ramp, said ramp being displaceable between an inclined position and a horizontal position, for guiding the pivoting of said stacker arms about said carriages, such that stacker arms moving from said retracted position to said stacking position are pivoted upward to pick up a row of elongated members from said conveyor portion, and that stackers arms moving from said stacking position to said retracted position are kept generally horizontal, so as to encompass said rows of elongated members conveyed on said conveyor portion;

wherein said plurality of stacker arms are divided in a first group of stackers arms and a second group of stacker arms, said first group of arms moving in concert from said retracted position to said stacking position so as to pick-up a row of elongated members being conveyed on said conveyor portion, while said second group of arms move oppositely in concert from said stacking portion to said retracted portion, and vice-versa.

2. The apparatus according to claim 1, further comprising:

a slat positioner for disposing slats between rows of said bundle being formed on said apparatus, comprising an outer shell portion defining a magazine for storing a stack of slats, said magazine being open at a bottom end thereof for slats to outlet therefrom; at least one pincer arm pivotally mounted to said outer shell portion so as to be displaceable between a pincer arm supporting position and a pincer arm bypassing position, said pincer arm having at least one finger projecting laterally from a bottom end thereof so as to block said open bottom end of said magazine when said pincer arm is in said pincer arm supporting position; and a carriage operatively mounted to said outer shell portion so as to translate vertically thereon, said carriage adapted for being actuated in displacement between a carriage retracted position and a carriage discharging position, said carriage having at least one transport arm pivotally mounted thereto, said transport arm having at least one support surface portion projecting laterally from a bottom thereof, said support surface portion being positioned generally below said open bottom end of said magazine; wherein displacement of said carriage from said carriage discharging position to said carriage retracted position actuates said pincer arm into pivoting from said pincer arm supporting position to said pincer arm bypassing position, and back to said pincer arm supporting position, so as to dispense a bottommost slat from said stack of slats in said magazine onto said support surface portion of said transport arm, and wherein displacement of said carriage from said carriage retracted position to said carriage discharging position causes said slat on said support surface portion to be disposed on said bundle being formed.

3. The apparatus according to claim 2, wherein said carriages, said conveyor portion, said ramps and said carriage of said slat positioner are actuated by a single motor.

4. The apparatus according to claim 1, wherein said follower portion of each said stacker arm has a wheel for rolling on said ramps.

5. The apparatus according to claim 1, wherein said ramps are displaced between said horizontal position and said inclined position by at least one cam.

6. The apparatus according to claim 1, wherein each said stacker arm has an abutment on a top edge surface thereof for aligning rows disposed thereon.

7. The apparatus according to claim 1, wherein rows of elongated members are disposed on said stacking platform by an immovable stop wall abutting against an endmost elongated member of a row of elongated members for making said row slip off from said stacker arms when same move from said stacking position to said retracted position.

8. The apparatus according to claim 1, wherein said carriages are each mounted on a rail so as to displace each said stacker arm between said retracted position and said stacking position.

9. The apparatus according to claim 8, wherein each said rail has a vertical plate, and each said carriage has wheels rolling against a bottom edge and a top edge of said plate.

10. The apparatus according to claim 1, wherein said carriages, said conveyor portion, and said ramps are actuated by a single motor.

11. The apparatus according to claim 10, wherein said motor actuates said conveyor portion and said ramps by sprockets, chains and cams.

12. The apparatus according to claim 10, wherein said motor actuates said carriages between said retracted position and said stacking positions by sprockets, chains and a reciprocating drive linkage.

13. The apparatus according to claim 1, wherein said stacker arms are pivotally mounted to said carriages by pivot connections.

14. An apparatus for disposing slats between rows of a product being deposited on a bundle being formed, comprising:

an outer shell portion defining a magazine for storing a stack of slats, said magazine being open at a bottom end thereof for slats to outlet therefrom;

at least one pincer arm pivotally mounted to said outer shell portion so as to be displaceable between a pincer arm supporting position and a pincer arm bypassing position, said pincer arm having at least one finger projecting laterally from a bottom end thereof so as to block said open bottom end of said magazine when said pincer arm is in said pincer arm supporting position; and a carriage operatively mounted to said outer shell portion so as to translate vertically thereon, said carriage adapted for being actuated in displacement between a carriage retracted position and a carriage discharging position, said carriage having at least one transport arm pivotally mounted thereto, said transport arm having at least one support surface portion projecting laterally from a bottom thereof, said support surface portion being positioned generally below said open bottom end of said magazine;

wherein displacement of said carriage from said carriage discharging position to said carriage retracted position actuates said pincer arm into pivoting from said pincer arm supporting position to said pincer arm bypassing position, and back to said pincer arm supporting position, so as to dispense a bottommost slat from said stack of slats in said magazine onto said support surface portion of said transport arm, and wherein displacement of said carriage from said carriage retracted position to said carriage discharging position causes said slat on said support surface portion to be disposed on the bundle being formed.

15. The apparatus according to claim 14, comprising two pincer arms moving analogously.

16. The apparatus according to claim 15, comprising two interconnected transport arms moving in concert.

17. The apparatus according to claim 14, wherein said pincer arm is biased toward said pincer arm supporting position.

18. The apparatus according to claim 17, wherein said pincer arm is displaced to said pincer arm bypassing position by a follower portion thereof being in operative contact with a pincer actuator arm of said carriage.

19. The apparatus according to claim 18, wherein said pincer actuator arm is pivotally mounted to said carriage so as to actuate said pincer arm solely when said carriage moves from said carriage discharging position to said carriage retracted position.

20. The apparatus according to claim 14, wherein said support surface portion of said transport arm is positioned below said finger of said pincer arm at a distance generally equivalent to thickness of one slat when said carriage is in said carriage retracted position.

21. The apparatus according to claim 20, wherein, when said pincer arm is pivoted from said pincer arm supporting position to said pincer arm bypassing position, and back to said pincer arm supporting position, said stack moves downward to be supported by said support surface portion, to then have a lip portion of said finger separating a bottommost slat of said stack, said finger then holding said stack in said magazine.

22. The apparatus according to claim 14, wherein said transport arm has a follower portion biased against a template so as to guide the pivoting of said transport arm with respect to said carriage.

23. The apparatus according to claim 22, wherein said template has a groove at a bottom thereof provided with a curved guide edge, such that said transport arm is pivoted by said curved guide edge to incline said support surface portion for disposing a slat on said support surface portion on said bundle.

24. The apparatus according to claim 23, wherein said slat on said support surface portion is pushed off said support surface portion by an immovable stopper leg connected to said outer shell.

25. The apparatus according to claim 23, wherein said groove is partially covered by a pivoting finger, whereby said follower portion of said transport arm must roll over said pivoting finger to enter in said groove.

26. The apparatus according to claim 14, wherein said magazine is open at a top end for loading said magazine with slats.

27. The apparatus according to claim 14, wherein said carriage is mounted on rollers so as to be received in rails of said outer shell to translate thereon.

* * * * *